United States Patent
Terai et al.

(10) Patent No.: US 7,171,640 B2
(45) Date of Patent: Jan. 30, 2007

(54) SYSTEM AND METHOD FOR OPERATION VERIFICATION OF SEMICONDUCTOR INTEGRATED CIRCUIT

(75) Inventors: Yuka Terai, Osaka (JP); Kyoji Yamashita, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/138,499

(22) Filed: May 27, 2005

(65) Prior Publication Data

US 2006/0010407 A1    Jan. 12, 2006

(30) Foreign Application Priority Data

Jul. 8, 2004    (JP)    ............................. 2004-201833

(51) Int. Cl.
    *G06F 17/50*    (2006.01)
(52) U.S. Cl. .................................. 716/5; 716/4; 716/6
(58) Field of Classification Search ................ 716/4–6
    See application file for complete search history.

(56) References Cited

U.S. PATENT DOCUMENTS

| | | | |
|---|---|---|---|
| 6,425,113 B1 * | 7/2002 | Anderson et al. ............... | 716/5 |
| 6,898,561 B1 * | 5/2005 | Liu et al. ....................... | 703/14 |
| 6,931,617 B2 * | 8/2005 | Sanie et al. .................... | 716/18 |
| 2005/0076316 A1 * | 4/2005 | Pierrat et al. ................... | 716/4 |
| 2005/0229130 A1 * | 10/2005 | Wu et al. ....................... | 716/8 |
| 2006/0190854 A1 * | 8/2006 | Watt .............................. | 716/4 |

FOREIGN PATENT DOCUMENTS

| | | |
|---|---|---|
| JP | 2002-203907 | 7/2002 |
| JP | 2004-30382 | 1/2004 |

* cited by examiner

*Primary Examiner*—Thua N. Do
*Assistant Examiner*—Naum B. Levin
(74) *Attorney, Agent, or Firm*—McDermott Will & Emery LLP (57) ABSTRACT

A system for operation verification of a semiconductor integrated circuit has a central processing unit, a design layout memory unit storing design layout information including the design layout configuration of the semiconductor integrated circuit, and a predicted final layout memory storing a predicted final layout configuration predicted by the central processing unit by adding an optical proximity effect to the design layout configuration. The system further has a netlister which describes a procedure for causing the central processing unit to produce a plurality of net lists in which different physical values are registered for a common element in the predicted final layout configuration, a netlist memory unit the plurality of net lists, and a circuit simulator which describes a procedure for causing the central processing unit to perform operation verification of the semiconductor integrated circuit by using an arbitrary one of the plurality of net lists.

10 Claims, 5 Drawing Sheets

SYSTEM AND METHOD FOR OPERATION VERIFICATION OF SEMICONDUCTOR INTEGRATED CIRCUIT

CROSS-REFERENCE TO RELATED APPLICATIONS

The teachings of Japanese Patent Application JP 2004-201833, filed Jul. 8, 2004, are entirely incorporated herein by reference, inclusive of the claims, specification, and drawings.

BACKGROUND OF THE INVENTION

The present invention relates to a system and method for operation verification of a semiconductor integrated circuit.

To achieve the higher integration and higher-speed operation of a semiconductor integrated circuit device, the operation verification of a semiconductor integrated circuit has been performed by using a circuit simulator in the recent chip-level design of the semiconductor integrated circuit. In this case, the chip-level operation verification of the circuit is performed as follows. First, circuit simulation on a logic-cell level is performed by using a net list and then a delay library necessary for the chip-level operation verification of the circuit is produced by using the result of the circuit simulation.

The delay library shows signal propagation delays between input signals to various circuit cells and output signals therefrom. The checking of whether or not final delay values in the circuit on the chip level satisfy design values using a large number of various delay libraries ensures the chip-level operation of the semiconductor integrated circuit.

In general, a delay library is generated from the design layout of circuit cells through the following procedure in two steps.

In the first step, netlist conversion is performed by using a netlister and by using design layout information 101 for circuit cells as an input to produce a net list as connection information between elements (transistors and the like). The netlister is a software program for calculating layout parameters which describes a procedure for causing a computer to read the layout parameters and produce a net list. The netlister detects, e.g., dimensional parameters representing a configuration, such as a gate length and a gate width, circuit connection information, a resistance, and a capacitance from the design layout information for circuit cells and causes the computer to describe such information in the net list.

Next, in the second step, circuit simulation is performed by using a circuit simulator and by using the net list outputted from the netlister as an input and then operation verification for a leakage current, a delay time, and the like is performed so that a characteristic library is produced.

As semiconductor integrated circuit devices have been further miniaturized in recent years, various factors including an optical proximity effect during exposure and the local effect of a dry etching process have caused size nonuniformity during processing. As a result, an error occurs between a final configuration and a layout configuration at design stage and the problem is encountered that a delay library has not described the characteristics of actually finished circuit cells with high precision.

To solve the problem, a method has been proposed which predicts a final layout configuration from the design layout configuration of circuit cells by considering an optical proximity effect during exposure, performs circuit simulation by using the predicted final layout configuration, and thereby produces a delay library (see, e.g., Patent Document 1: Japanese Laid-Open Patent Publication No. 2002-203907 (ABSTRACT)).

Figure 5:
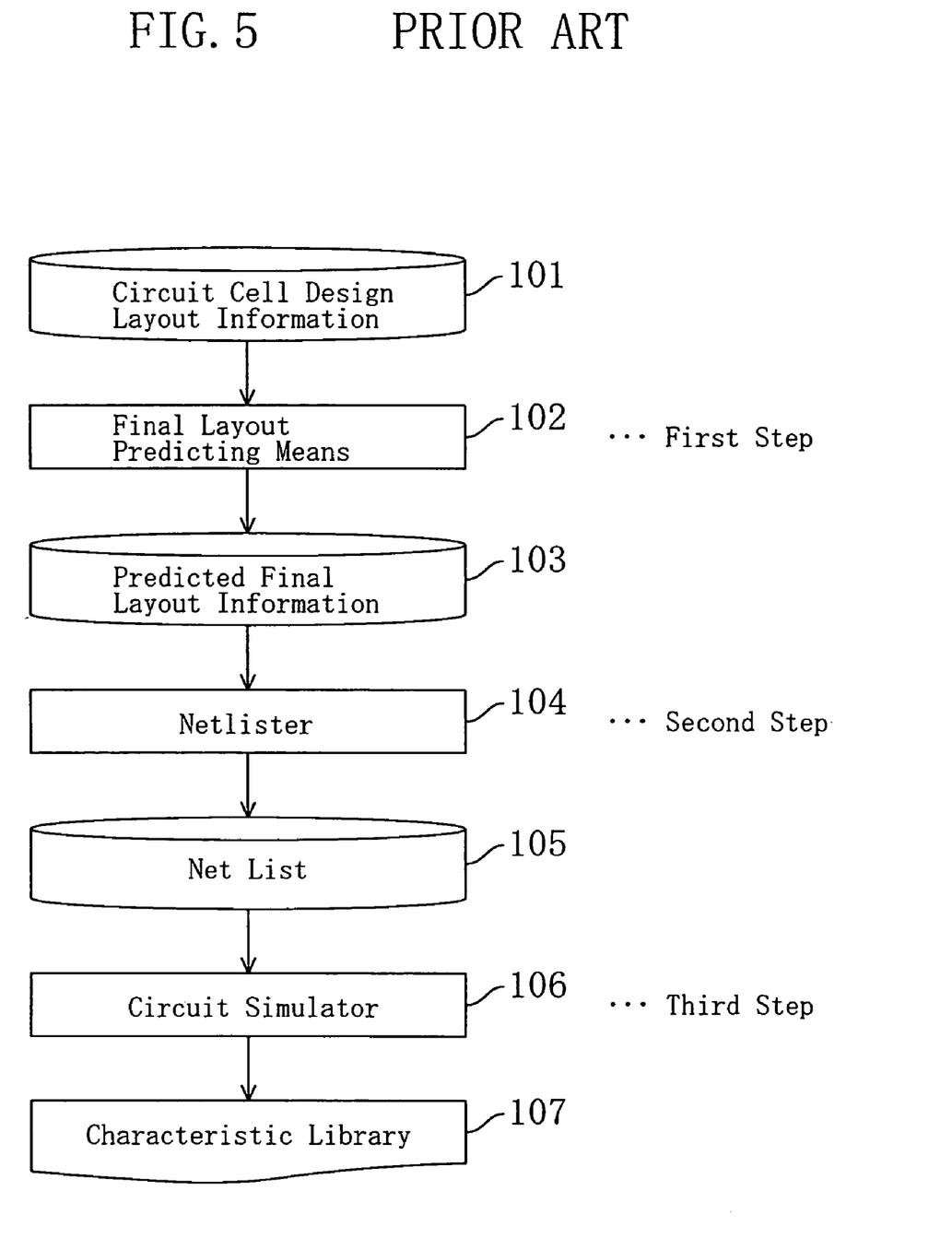
FIG. 5 is a block diagram for illustrating a conventional method for operation verification of a semiconductor integrated circuit.

Referring to FIG. 5, a conventional method for producing a characteristic library by considering an optical proximity effect during exposure will be described herein below. FIG. 5 is a block diagram for illustrating the conventional method for operation verification of a semiconductor integrated circuit, which is disclosed in Patent Document 1.

In a first step, an OPC (Optical Proximity Correction) process for considering the optical proximity effect on the circuit-cell design layout configuration is performed first by using final layout predicting means 102 and by using circuit-cell design layout information 101 as an input to produce predicted final layout information 103 having a post-manufacturing layout configuration.

Next, in a second step, netlist conversion is performed by using a netlister 104 and by using the predicted final layout information 103 outputted from the final layout predicting means 102 as an input to produce a net list 105 as connection information between elements and the like. The netlister 104 extracts dimensional parameters representing a configuration, such as a gate length and a gate width, circuit connection information, a resistance, and a capacitance from the predicted final layout information 103 for the circuit and describes them in the net list 105.

Next, in a third step, operation verification is performed by circuit simulation using a circuit simulator 106 and using the net list 105 extracted from the netlister 104 as an input to determine a leakage current, a delay time, and the like, thereby producing a characteristic library 107 containing these items of information.

In accordance with the method disclosed in Patent Document 1, characteristics considering the optical proximity effect during exposure are described in the characteristic library 107 since circuit simulation is performed by using the net list 104 produced by using the predicted final layout information 103 to which the OPC process has been performed.

However, a conventional method for operation verification considering an optical proximity effect as described above has the following drawbacks.

First, when the OPC process for correcting the optical proximity effect is performed by using the final layout predicting means 102 with respect to the circuit-cell design layout information 101 in the first step, the configuration of the predicted final layout information 103 becomes complicated.

Then, in the second step, the dimensional parameters (the physical values of an element such as a gate length) to be used for circuit simulation are calculated by using the netlister 104 and by using the predicted final layout information 103 as an input, whereby the net list 105 storing information related to the dimensional parameters is produced. Accordingly, a sequential set of dimensional parameters are described in the net list 105.

The configuration predicted with the predicted final layout information 103 is mostly complicated. However, performing operation verification by circuit simulation in which the dimensional parameters are exactly described in conformity with the complicated configuration by using a circuit simulator is unrealistic since it involves an enormous amount of calculation.

Therefore, it is inevitable to perform circuit simulation using a simplified set of dimensional parameters.

As a result, the conventional method has the problem that, even though delay calculation is performed and a characteristic such as power consumption during standby is verified by using the circuit simulator 106, operation verification cannot provide a high-precision result.

SUMMARY OF THE INVENTION

It is therefore an object of the present invention to provide a system and method for operation verification which enable simple, easy, and high-precision operation verification to be performed by producing net lists corresponding to the contents of operation verifications.

A system for operation verification according to the present invention comprises: a structure for causing a central processing unit to produce, as a net list which describes a predicted final layout configuration to be used to verify a plurality of circuit characteristics, a plurality of net lists in which different physical values are registered for a common element in the predicted final layout configuration and perform operation verification of a semiconductor integrated circuit by using the net list.

This makes it possible to perform operation verification of the semiconductor integrated circuit by selecting the net list having the physical value appropriate for the type of the circuit characteristic to be verified. By performing the operation verification under, e.g., the most extreme conditions for the circuit characteristic, it becomes possible to determine the limits of the semiconductor integrated circuit that can be guaranteed and the like with simplicity, ease, and high precision.

Preferably, the system for operation verification according to the present invention further comprises a plurality of characteristic libraries for storing the characteristics of the semiconductor integrated circuit on a basis of each of the plurality of net lists used in the operation verification. The provision of first and second characteristic libraries for producing first and second net lists for the verification of, e.g., power consumption and a delay time and storing therein the verified power consumption and delay time allows simple, easy, and high-precision evaluation of the significant ones of the characteristics of the semiconductor integrated circuit.

By using, e.g., a gate length which becomes minimum in a logic AND region between a gate region and an active region in a predicted final layout configuration as the gate length of a MIS transistor in the first net list, it becomes possible to perform simple, easy, and high-precision operation verification for the power consumption which is determined by the portion with the smallest gate length even when the gate length varies greatly in the predicted final layout configuration.

By using, e.g., a gate length obtained by dividing the area of the logic AND region between the gate region and the active region in the predicted final layout configuration by a source-side gate width as the gate length of a MIS transistor in the second net list, it becomes possible to perform simple, easy, and high-precision operation verification for the delay characteristic which is determined by a source-to-drain current.

The system for operation verification according to the present invention may also have a third characteristic library for producing a third net list for the verification of a capacitance and storing therein the verified capacitance.

In that case, by using, e.g., a gate length obtained by dividing the area of the logic AND region between the gate region and the active region in the predicted final layout configuration by an average value of the source-side gate width and a drain-side gate width as the gate length of a MIS transistor in the third net list, it becomes possible to perform simple, easy, and high-precision operation verification for the capacitance characteristic which is determined by the area of the logic AND region.

A method for operation verification according to the present invention is a method which produces a plurality of net lists in which different physical values are registered for a common element in a predicted final layout configuration and performs operation verification of a semiconductor integrated circuit by using a circuit simulator and by using one of the plurality of net lists.

In accordance with the method, it becomes possible to perform operation verification of the semiconductor integrated circuit by selecting the net list having the physical value appropriate for the type of the circuit characteristic to be verified. By adopting the physical value such that the operation verification is performed with highest precision for the circuit characteristic, e.g., the characteristic of the semiconductor integrated circuit can be verified with simplicity, ease, and high precision.

By storing the characteristics of the semiconductor integrated circuit obtained as a result of the operation verification in a plurality of characteristic libraries on the basis of each of the plurality of net lists used in the operation verification, a comparison with design contents can be performed easily.

By producing, as the plurality of net lists, a first net list for verifying power consumption and a second net list for verifying a delay time, verifying the power consumption and the delay time by using the first and second net lists, and storing the verified power consumption and the verified delay time in the first and second characteristic libraries, it becomes possible to perform the evaluation of the significant ones of the characteristics of the semiconductor integrated circuit with simplicity, ease, and high precision.

By producing the first net list by using, e.g., a gate length which becomes minimum in a logic AND region between a gate region and an active region in a predicted final layout configuration of a MIS transistor as the gate length to be used for the operation verification, it becomes possible to perform simple, easy, and high-precision operation verification for the power consumption which is determined by the portion with the smallest gate length even when the gate length varies greatly in the predicted final layout configuration.

By producing the second net list by using, e.g., a gate length obtained by dividing the area of the logic AND region between the gate region and the active region in the predicted final layout configuration of a MIS transistor by a source-side gate width as the gate length to be used for the operation verification, it becomes possible to perform simple, easy, and high-precision operation verification for the delay characteristic which is determined by a source-to-drain current.

It is also possible to produce a third net list for verifying a capacitance and store the verified capacitance in a third characteristic library.

In that case, by producing the third net list by using a gate length obtained by dividing the area of the logic AND region between the gate region and the active region in the predicted final layout configuration by an average value of the source-side gate width and a drain-side gate width, it becomes possible to perform simple, easy, and high-precision operation verification for the capacitance characteristic which is determined by the area of the logic AND region.

Thus, the system for operation verification or the verification method according to the present invention allows simple, easy, and high-precision verification to be performed for two or more characteristics for which operation verification is to be performed, such as, e.g., a delay time and power consumption during standby.

DETAILED DESCRIPTION OF THE INVENTION

Embodiment 1

Referring to the drawings, a method for producing characteristic libraries in consideration of an optical proximity effect during exposure according to a first embodiment of the present invention will be described herein below.

Figure 1:
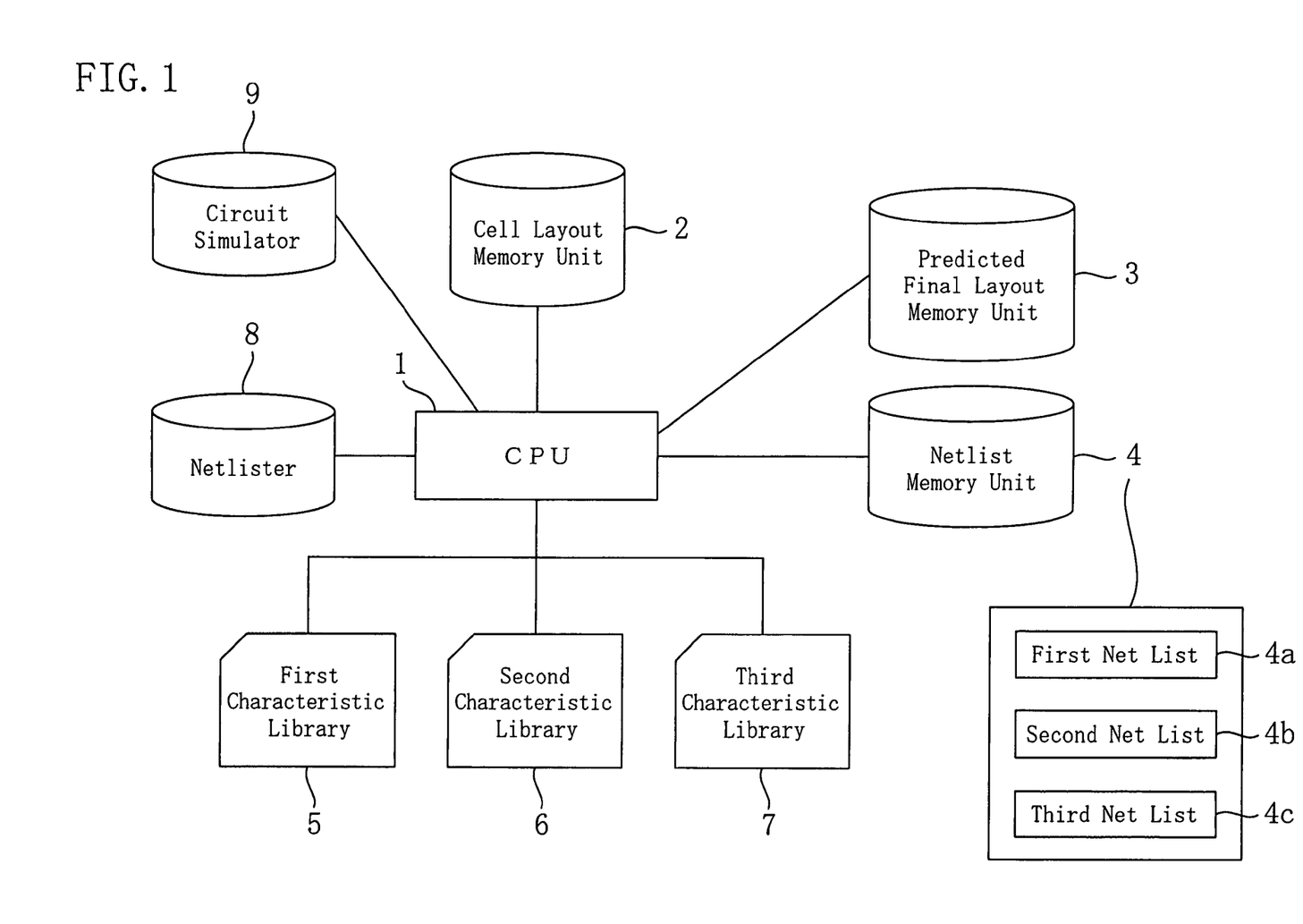
FIG. 1 is a block diagram schematically showing a structure of a system for operation verification of a semiconductor integrated circuit according to a first embodiment of the present invention.

FIG. 1 is a block diagram schematically showing a structure of a system for operation verification of a semiconductor circuit according to the first embodiment.

As shown in FIG. 1, the system for operation verification according to the present embodiment comprises: a CPU 1 as a central processing unit; a cell layout memory unit 2 for storing the design layout of individual cells in the circuit; a predicted final layout memory unit 3 for storing a predicted final layout that has been predicted by the CPU 1; a net list 4 for storing connecting relations between the individual cells; first, second, and third characteristic libraries 5, 6, and 7 for storing a plurality of different characteristics produced as a result of operation verification; a netlister 8 which is a software program for netlist production stored in a recording medium such as a CD-ROM; and a circuit simulator 9 which is a software program for circuit simulation stored in a recording medium such as a CD-ROM. The net list 4 includes first, second, and third net lists 4a, 4b, and 4c which store different physical values for a common element in the predicted final layout configuration. The specific contents of the first, second, and third net lists 4a, 4b, and 4c and the first to third characteristic libraries will be described later.

Figure 2:
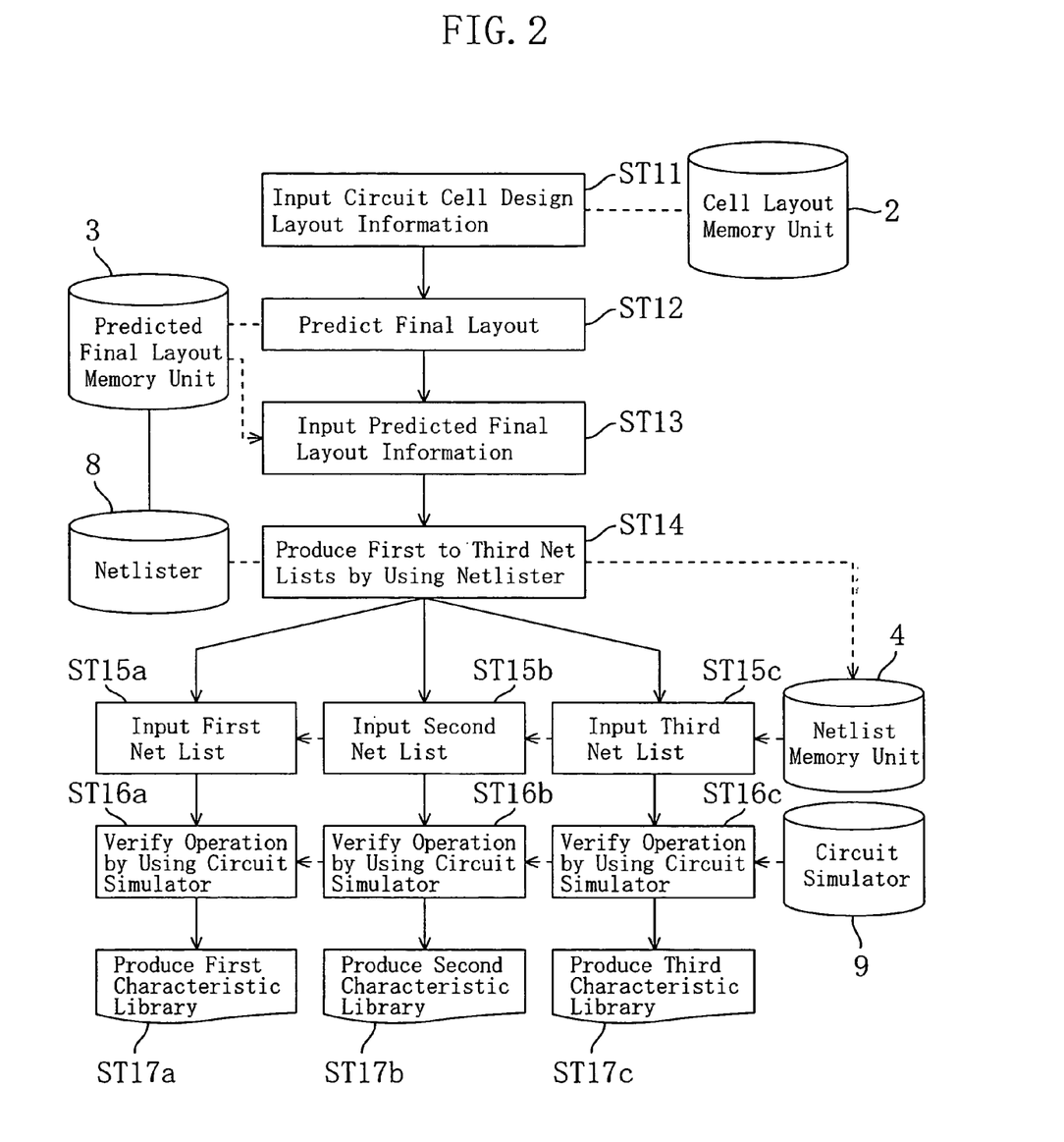
FIG. 2 is a flow chart illustrating a method for operation verification using the system for operation verification of a semiconductor integrated circuit according to the first embodiment.

FIG. 2 is a flow chart illustrating a method for producing a library by using the system for operation verification of a semiconductor integrated circuit according to the first embodiment.

First, in a step ST11, circuit-cell design layout information is inputted from the cell layout memory unit 2 to the CPU 1 so that a final layout is predicted in a step ST12. The result of the prediction is stored in the predicted final layout memory unit 3. At this time, an OPC process for considering an optical proximity effect on a circuit-cell design layout configuration is performed to produce predicted final layout information having a post-manufacturing layout configuration.

Figure 3A:
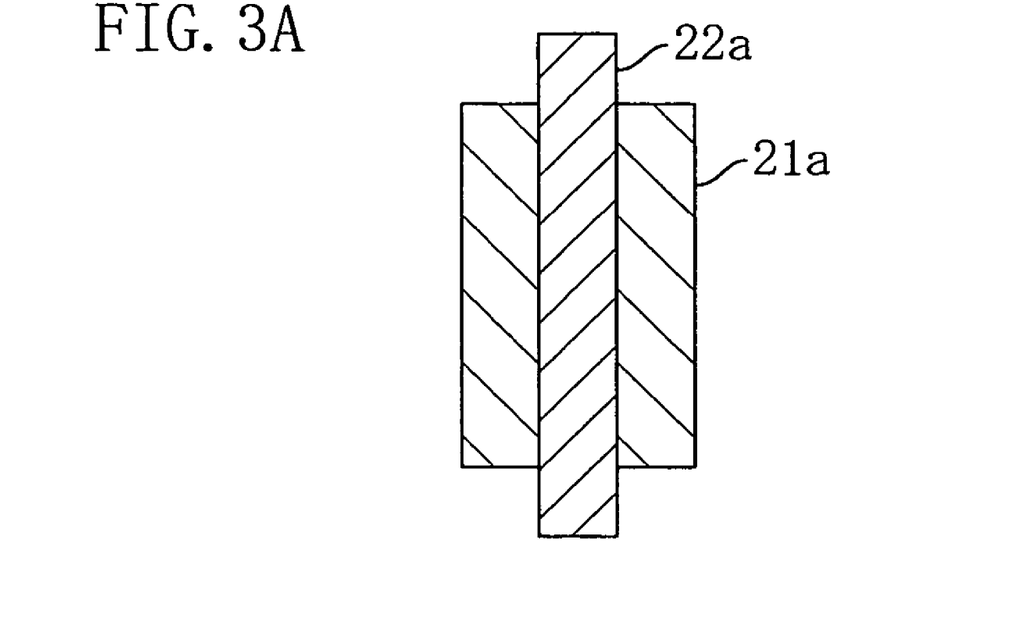
FIG. 3A is a plan view showing a MIS transistor in circuit-cell design layout information and FIG. 3B is a plan view showing a MIS transistor in predicted final layout information after an OPC process.
Figure 3B:
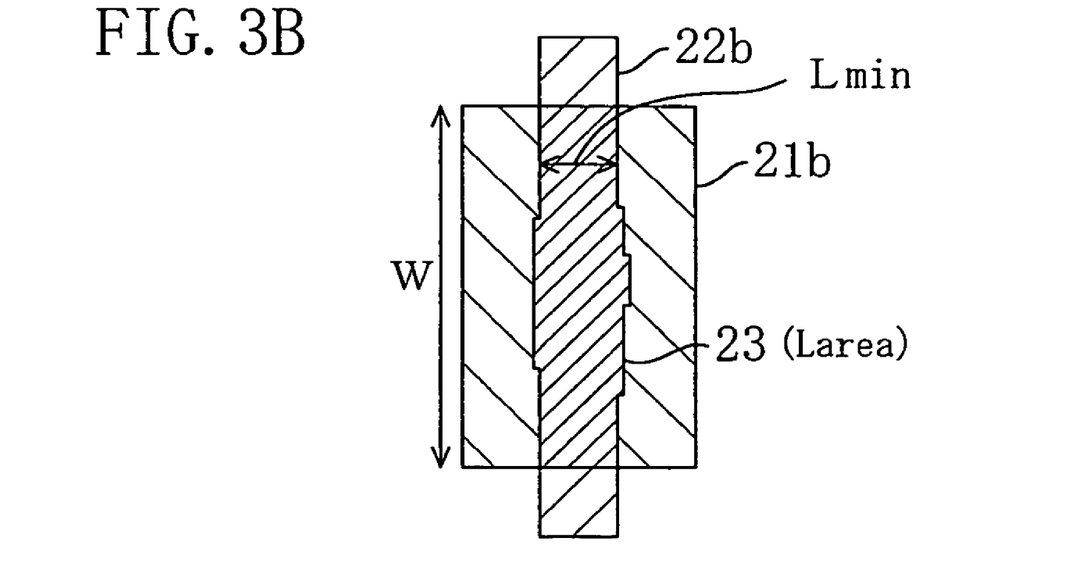

FIG. 3A is a plan view showing a MIS transistor in the circuit-cell design layout information and FIG. 3B is a plan view showing a MIS transistor in the predicted final layout information after the predicting process.

As shown in FIG. 3A, in the circuit-cell design layout information, the design active region 21a and design gate region 22a of the MIS transistor presents a simple layout which is a combination of two rectangles.

By contrast, the local effect of dry etching, CVD, PVD, CMP, plating, or the like, a tapered configuration, and the like as well as the optical proximity effect during exposure and the resist configuration are predicted in the step ST12 to predict a final layout. Since an OPC process considering the optical proximity effect during exposure and the like are performed in the step ST12, a predicted final gate region 22b formed on a predicted final active region 21b and the like have configurations more complicated than those of the design gate region 22a and the like in the circuit-cell design layout information, as shown in FIG. 3B.

Next, in a step ST13, the predicted final layout information is inputted from the predicted final layout memory unit 3 to the CPU 1. In a step ST14, netlist conversion based on the predicted final layout information extracted from the final layout memory unit 3 is performed by using the netlister 8 to produce the first, second, and third net lists 4a, 4b, and 4c. The netlister 8 is a program for netlist production which is stored in a recording medium such as a CD-ROM, DVD, or the like. In the netlister 8, there is described a computer readable procedure for extracting parameters such as circuit connection information, a resistance, a capacitance, a gate length, a gate width, and the width and length of an active region from the predicted final layout information for the circuit and producing the first, second, and third net lists 4a, 4b, and 4c each of which describes necessary information for operation verification depending on the content of operation verification. For example, the first net list 4a is for generating a power consumption library for calculating power consumption during standby. The second net list 4b is for generating a delay library for calculating a delay time. The third net list 4c is for generating a capacitance library for calculating a capacitance. These net lists 4a, 4b, and 4c have respective parameters described therein which are different from each other. For example, physical values and connection information which allow operation verification to be performed with highest precision for parameters including a leakage current, a delay time, and a capacitance are described.

When the parameters described in the net lists are extracted by the netlister 8 based on the predicted final layout information having such a transistor configuration as shown in FIG. 3B, the parameters include the gate length and gate width of the transistor.

At this time, a gate length Lmin (see FIG. 3B) which becomes minimum in a logic AND region 23 between the predicted final gate region 22b and the predicted final active region 21b is described as the representative value of a gate length Lgate 1 in the first net list 4a for calculating power consumption, as shown in the following expression (1):

$$\text{Lgate 1} = \text{Lmin} \tag{1}$$

Although the gate length Lgate 1 described in the net list 4*a* for calculating power consumption is assumed herein to be the minimum gate length Lmin, it may also be another representative value which has been calculated such that a power consumption library generated by executing circuit simulation represents a leakage current with high precision.

In the second net list 4*b* for calculating delay, a gate length obtained by calculating the area Larea of the logic AND region 23 between the predicted final gate length 22*b* and the predicted final active region 21*b* and then dividing the area Larea by a source-side gate width is described as a gate length Lgate 2, as shown in the following expression (2):

$$Lgate\ 2 = Larea/Ws \quad (2).$$

In the third net list 4*c* for calculating capacitance, a gate length obtained by calculating the area Larea of the logic AND region 23 between the predicted final gate region 22*b* and the predicted final active region 21*b* and then dividing the area Larea by an average value of the source-side gate width Ws and a drain-side gate width Wd is described, as shown in the following expression (3):

$$Lgate\ 3 = Larea/[(Ws+Wd)/2] \quad (3).$$

Next, in steps ST15*a*, ST15*b*, and ST15*c*, the first to third net lists 4*a*, 4*b*, and 4*c* are inputted from the net list 4. Then, in steps ST16*a*, ST16*b*, and ST16*c*, circuit simulation is performed by using a circuit simulator such as HSPICE. Subsequently, in steps ST17*a*, ST17*b*, and ST17*c*, the first, second, and third characteristic libraries 5, 6, and 7 each having a layout which maximizes parameters such as a leakage current, a delay time, and a capacitance are produced. In the present embodiment, the first characteristic library 5 is a power consumption library, the second characteristic library 6 is a delay library, and the third characteristic library 7 is a capacitance library.

Figure 4A:
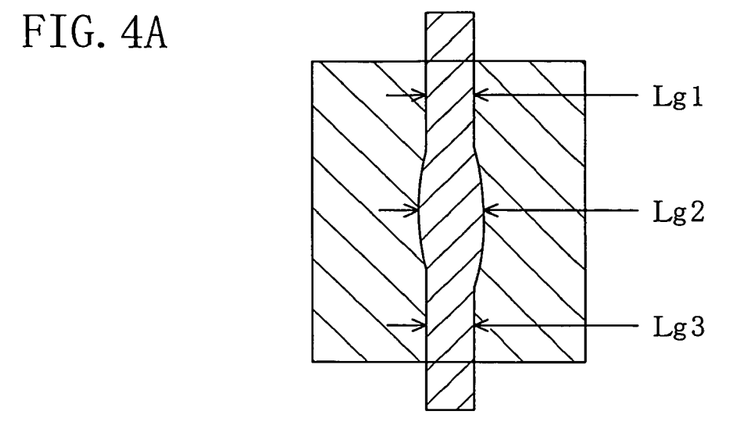
FIG. 4A is a plan view showing a final layout in which the gate length of a MIS transistor is not uniform.
Figure 4B:
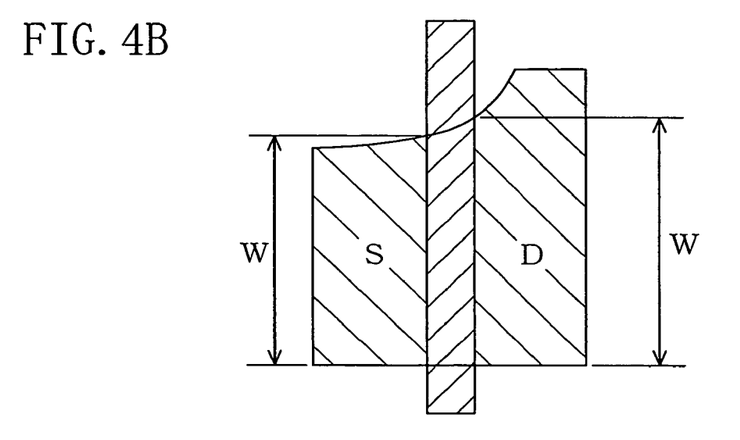
FIG. 4B is a plan view showing a final layout in which the gate width of a MIS transistor is not uniform.
Figure 4C:
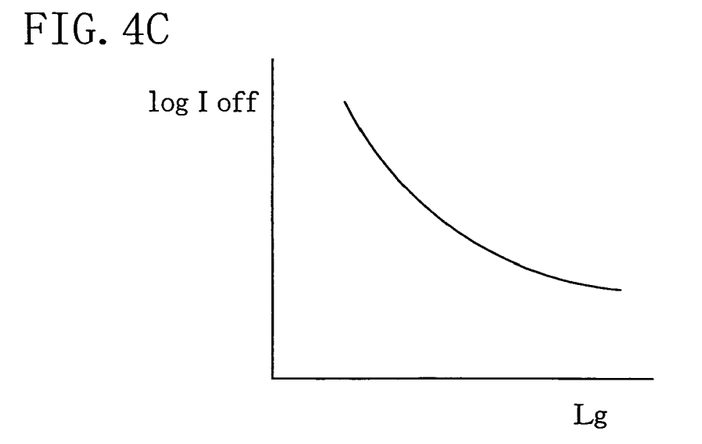
FIG. 4C is a view showing the gate-width dependence of leakage current.

A description will be given to the meanings of the gate lengths Lgate 1 and Lgate 2 and the gate width W in the first net list 4*a* which places significance on power consumption and in the second net list 4*b* which places significance on delay. FIG. 4A is a plan view showing a final layout of a MIS transistor in which the gate length is not uniform. FIG. 4B is a plan view showing a final layout of a MIS transistor in which the gate width is not uniform. FIG. 4C is a view showing the gate-length dependence of a leakage current.

As shown in FIG. 4A, when the gate length is Lg1, Lg2, Lg3, . . . and is not uniform, it follows that a MIS transistor structure composed of a plurality of partial MIS transistors which have the different gate lengths Lg1, Lg2, Lg3, . . . and are arranged in parallel is provided. However, as shown in FIG. 4C, an OFF leakage current Ioff shows the gate-length dependence with which it abruptly increases when the gate length Lg becomes smaller. Accordingly, the power consumption of the MIS transistor is determined by the partial MIS transistor having the minimum gate length so that, even if the minimum gate length Lmin is used as the representative value of the gate length of the MIS transistor during the operation verification, the precision with which the power consumption is calculated is retained high. Therefore, circuit simulation is performed by using the first net list 4*a* during the operation verification for power consumption.

As for the delay, it is determined by a source-to-drain current Ids which is inversely proportional to the gate length Lg. Accordingly, the delay is given by the following expressions:

$$Ids \propto 1/Lg$$

$$Ids = k \int (1/Lg(w))dw$$

$$= k' \int Lg(w)dw$$

$$= k'S$$

$$= k'Lg \cdot W.$$

Therefore, the gate length Lg becomes:

$$Lgate\ 2 = S/W = Larea/Ws$$

and the gate length Lgate 2 defined by the foregoing expression (2) is described in the second net list 4*b*. The area Larea of the logic AND region is calculated extremely simply and easily. When the respective areas of the source/drain regions are not equal as shown in FIG. 4B, the source-to-drain current is defined by the source-side gate width Ws so that the source-side gate width Ws is used as the gate width W.

On the other hand, the capacitance is determined by the area of the overlapping region between the active region and the gate region, i.e., the area Larea of the logic AND region 23. Accordingly, when the respective areas of the source/drain regions are not equal as shown in FIG. 4B, the relationship represented by the following expression is established:

$$Larea = Lg \cdot [(Ws+Wd)/2].$$

Therefore, $$Lgate\ 3 = Larea/[(Ws+Wd)/2]$$

is satisfied and the gate length Lgate 3 defined by the foregoing expression (3) is described in the third net list 4*c*.

According to the present embodiment, the plurality of first to third net lists 4*a* to 4*c* are produced by using the netlister 8 and by using the predicted final layout obtained by performing the OPC process for considering the optical proximity effect on the circuit design layout configuration or the like and then the first to third characteristic libraries 5, 6, and 7 in accordance with the contents of operation verifications are produced by performing circuit simulations using the plurality of net lists 4*a* to 4*c*. Since the characteristic libraries 5, 6, and 7 are thus generated in accordance with the contents of the individual operation verifications, the characteristic libraries having sufficient precision for performing high-precision chip-level operation verification can be obtained.

If simulation is performed by particularly selecting one of the plurality of net lists such that operation verification for a certain parameter is performed with highest precision, the characteristic for the parameter can be obtained with high precision so that the objective of the verification is attained.

The present invention is useful for the high-precision operation verification of circuit cells in the circuit design of a semiconductor integrated circuit.

What is claimed is:

1. A system for operation verification of a semiconductor integrated circuit, the system comprising:
 a central processing unit;
 a design layout memory unit which stores therein design layout information including at least a design layout configuration of the semiconductor integrated circuit in which a plurality of semiconductor elements are integrated;

a predicted final layout memory unit which stores therein a predicted final layout configuration that has been predicted by the central processing unit by adding at least an optical proximity effect to the design layout configuration;

a netlister which describes a procedure for causing the central processing unit to produce, as a net list described based on the predicted final layout configuration to be used to verify a plurality of circuit characteristics, a plurality of net lists in which different physical values are registered for a common element in the predicted final layout configuration;

a netlist memory unit for storing the plurality of net lists;

a circuit simulator which describes a procedure for causing the central processing unit to perform operation verification of the semiconductor integrated circuit by using an arbitrary one of the plurality of net lists; and a plurality of characteristic libraries for storing characteristics of the semiconductor integrated circuit on a basis of each of the plurality of net lists used in the operation verification;

wherein:

the netlister describes the procedure for causing the central processing unit to produce at least a first net list for verifying power consumption and a second net list for verifying a delay time, and the plurality of characteristic libraries include a first characteristic library for storing therein the power consumption verified by using the first net list and a second characteristic library for storing therein the delay time verified by using the second net list.

2. The system for operation verification of claim 1, wherein the netlist memory unit stores a gate length which becomes minimum in a logic AND region between a gate region and an active region in the predicted final layout configuration of a MIS transistor as a gate length in the first net list.

3. The system for operation verification of claim 1, wherein the netlister stores a gate length obtained by dividing an area of a logic AND region between a gate region and an active region in the predicted final layout configuration of a MIS transistor by a source-side gate width as a gate length in the second net list.

4. The system for operation verification of claim 1, wherein the netlister further describes the procedure for causing the central processing unit to produce a third net list for verifying a capacitance and the plurality of characteristic libraries further include a third characteristic library for storing therein the capacitance verified by using the third net list.

5. The system for operation verification of claim 4, wherein the netlister stores a gate length obtained by dividing an area of a logic AND region between a gate region and an active region in the predicted final layout configuration of a MIS transistor by an average value of a source-side gate width and a drain-side gate width as a gate length in the third net list.

6. A method for operation verification of a semiconductor integrated circuit, the method comprising the steps of:

(a) producing, by using a central processing unit, a predicted final layout configuration which is predicted by adding at least an optical proximity effect to a design layout configuration in design layout information for the semiconductor integrated circuit;

(b) storing the predicted final layout configuration in a predicted final layout configuration memory unit;

(c) producing, by using a netlister, a plurality of net lists in which different physical values are registered for a common element in the predicted final layout configuration as a net list described based on the predicted final layout configuration to be used to verify a plurality of circuit characteristics via the central processing unit;

(d) storing the plurality of net lists in a netlist memory unit;

(e) performing, by using a circuit simulator, operation verification of the semiconductor integrated circuit by using an arbitrary one of the plurality of net lists stored in the netlist memory unit; and (f) storing the characteristics of the semiconductor integrated circuit obtained as a result of the operation verification in a plurality of characteristics libraries on a basis of each of the plurality of net lists used in the operation verification;

wherein, the step (c) includes producing at least a first net list for verifying power consumption and a second net list for verifying a delay time, the step (e) includes verifying the power consumption by using the first net list and verifying the delay time by using the second net list, and the step (f) includes storing the verified power consumption in a first characteristic library and storing the verified delay time in a second characteristic library.

7. The method for operation verification of claim 6, wherein the step (c) includes producing the first net list by using, as a gate length to be used for the operation verification, a gate length which becomes minimum in a logic AND region between a gate region and an active region in the predicted final layout configuration of a MIS transistor.

8. The method for operation verification of claim 6, wherein the step (c) includes producing the second net list by using, as a gate length to be used for the operation verification, a gate length obtained by dividing an area of a logic AND region between a gate region and an active region in the predicted final layout configuration of a MIS transistor by a source-side gate width.

9. The method for operation verification of claim 6, wherein the step (c) includes further producing a third net list for verifying a capacitance, the step (e) includes verifying the capacitance by using the third net list, and the step (f) includes storing the verified capacitance in a third characteristic library.

10. The method for operation verification of claim 9, wherein the step (c) includes producing the third net list by using, as a gate length to be used for the operation verification, a gate length obtained by dividing an area of a logic AND region between a gate region and an active region in the predicted final layout configuration of a MIS transistor by an average value of a source-side gate width and a drain-side gate width.

* * * * *